United States Patent
Lee et al.

(10) Patent No.: US 7,925,876 B2
(45) Date of Patent: Apr. 12, 2011

(54) COMPUTER WITH EXTENSIBLE FIRMWARE INTERFACE IMPLEMENTING PARALLEL STORAGE-DEVICE ENUMERATION

(75) Inventors: Terry Ping-Chung Lee, Antelope, CA (US); Ram Krishan Kaul, San Jose, CA (US); Vijay Vishwanath Hegde, Bangalore (IN); Santosh Ananth Rao, Santa Clara, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 859 days.

(21) Appl. No.: 11/838,298

(22) Filed: Aug. 14, 2007

(65) Prior Publication Data

US 2009/0049292 A1   Feb. 19, 2009

(51) Int. Cl.
*G06F 15/177* (2006.01)

(52) U.S. Cl. ....... 713/2; 713/1; 710/8; 710/21; 711/100; 711/170

(58) Field of Classification Search ................... 713/1, 2; 710/8, 21; 711/100, 170
See application file for complete search history.

(56) References Cited

U.S. PATENT DOCUMENTS

| | | | |
|---|---|---|---|
| 5,768,542 A * | 6/1998 | Enstrom et al. ............... 710/104 |
| 7,246,179 B2 * | 7/2007 | Camara et al. .................... 710/5 |
| 7,320,052 B2 * | 1/2008 | Zimmer et al. ............... 711/114 |
| 2003/0093510 A1* | 5/2003 | Cen ............................. 709/223 |
| 2003/0120909 A1 | 6/2003 | Zimmer et al. |
| 2005/0071617 A1 | 3/2005 | Zimmer et al. |
| 2005/0289332 A1 | 12/2005 | Rothman et al. |
| 2006/0020837 A1 | 1/2006 | Rothman et al. |
| 2007/0033388 A1 | 2/2007 | Zhou et al. |

* cited by examiner

*Primary Examiner* — Thuan N Du

(57) ABSTRACT

A computer includes an extensible firmware interface with a storage device enumeration function that performs storage device enumeration operations in parallel.

15 Claims, 1 Drawing Sheet

COMPUTER WITH EXTENSIBLE FIRMWARE INTERFACE IMPLEMENTING PARALLEL STORAGE-DEVICE ENUMERATION

BACKGROUND OF THE INVENTION

Computers manipulate data in accordance with programs of instructions. The purpose(s) served by a computer is determined by the application program or programs running on that computer. Rather than running directly on computer hardware, application programs typically run on an operating system that serves as a standard interface between applications programs and hardware. Thus, application developers can develop for a single interface defined by the operating system, while the operating system developer and hardware developers work to ensure compatibility between the hardware and the operating system. Thus, when a new piece of hardware is introduced, e.g., a new peripheral, it would come with a driver program that would enable the operating system to use the peripheral.

The task of the hardware developer has been complicated by the existence of different operating systems. Typically, each operating system would require a separate driver—either to work with the hardware at all or at least to work with it optimally. The task of developing, testing and supporting multiple drivers for multiple operating systems add to the cost and the development time for hardware.

The "Extensible Firmware Interface" is an industry standard basic input-output system (BIOS) layer between the operating system and hardware that does for hardware what operating systems did for application programs. The EFI is software loaded from firmware, e.g., flash memory, upon system start up. Once loaded, it takes control of the boot process. Generally, the EFI layer provides a single interface for which hardware drivers are designed. Operating system developers of course have to provide compatibility with the EFI.

When a computer is powered on or restarted, the operating system must be found and launched before any application programs can be run. Some computers provide only a single location for an operating system, so finding the operating system is not an issue. Other computers provide a prioritized list of locations at which an operating system can be found. In those system, the first location in the list (Storage device A:, Storage device B:, Storage device C:, etc.) to have an operating system is the one used to boot the operating system. Storage devices divided into logical partitions are searched partition-by-partition.

The "Small Computer Systems Interface" or "SCSI" provides a way to expand the storage device storage of a computer. By installing a SCSI interface, one could add a number of SCSI-compatible devices, such as hard storage devices. A boot routine would query the SCSI interface, which would check each possible SCSI location to see if it was populated with some device. At the end of this routine, a list of available devices could be used to guide the search for an operating system. If there were multiple such SCSI interfaces, they could be queried in turn for available storage devices.

Enterprise servers often have large numbers of storage devices attached (internal or SAN). Configuring the boot storage devices on EFI-based servers with large numbers of storage devices presents challenges for usability, deployment, and provisioning. When a sequential approach to enumeration is scaled to such large systems, the latency involved in storage device enumeration can be costly. In a large data center, there can be tens of thousands of storage devices that would take hours to enumerate serially.

Rather than accept this delay, the possible locations of an operating system can be identified manually. An administrator could do the configuring during a boot up sequence using a special monitor program, or it could be done through the operating system, with the target storage device identities stored in a configuration file available to the boot routine. While this greatly reduces the latency associated with boot up, it imposes a burden on computer administration. Manual interaction could be complicated if storage device interfaces ("host bus adapters") were provided from different manufacturers using different proprietary interfaces for manual enumeration. What is needed is a fast automated approach to storage device enumeration.

Herein, related art is described to facilitate understanding of the invention. Related art labeled "prior art" is admitted prior art; related art not labeled "prior art" is not admitted prior art.

BRIEF DESCRIPTION OF THE DRAWING

The figure depicts implementations/embodiments of the invention and not the invention itself.

DETAILED DESCRIPTION

Figure 1:
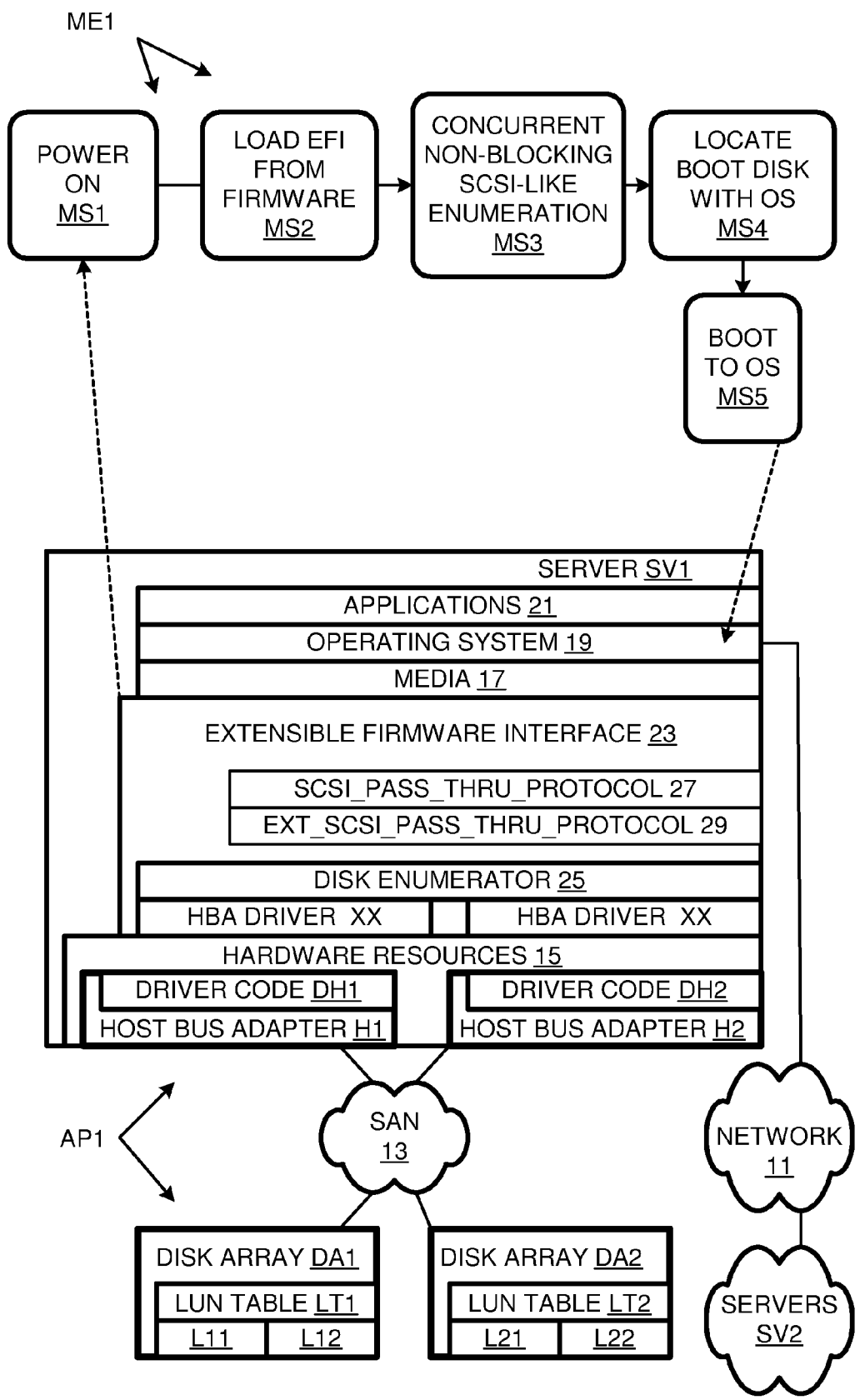
FIG. 1 is a combination schematic diagram and flow chart of a system and a method in accordance with embodiments of the invention.

The invention makes use of the non-blocking SCSI operations supported by the EFI SCSI_PASS_THRU_PROTOCOL and EXT_SCSI_PASS_THRU_PROTOCOL standard interfaces to provide for parallel disk enumeration operations. In addition, use of the EXT_SCSI_PASS_THRU_PROTOCOL allows LUN enumeration by multiple HBAs to be performed in parallel, again speeding up the enumeration process. Thus, the latency involved in automated complete storage device enumeration is reduced by a factor corresponding to the level of parallelism achieved relative to conventional approaches in which the BIOS blocks subsequent disk enumeration operations while one is pending.

The ability to enumerate all attached storage devices eases system boot configuration (being able to select and find the correct boot storage device) and provisioning/deployment scenarios (being able to provision a system that boots from a SAN). This invention eliminates the need for HBA vendor-specific device enumeration policies. System usability is improved, and system provisioning and deployment (for configurations using SAN boot) can be much more easily done using automated solutions. Finally, in situations where system maintenance tasks required the ability to enumerate all storage devices, expensive system downtime (on the order of several extra hours) is reduced significantly.

As shown in FIG. 1, a computer system AP1 in accordance with an embodiment of the invention includes server SV1 and other servers SV2, storage device arrays DA1 and DA2, a network 11 for inter-computer communications, and a storage array network (SAN) 13 for the computers to access storage device arrays DA1 and DA2. In practice, there would be many more storage device arrays. Storage device array DA1 is divided into logical units L11 and L12 as shown in LUN table TL1, while storage device array is divided into logical units L21 and L22, as shown in LUN table LT2

In respects relevant to the present invention, server SV1 is typical of servers SV2 in general, although they may differ in several respects, including the application run, the operating system involved, the number of host-bus adapters (HBAs) involved, etc. Server SV1 includes hardware resources 15, including processors, memory, and communications devices including I/O devices such as host bus adapters HB1 and HB2, each with embedded driver code, DH1 and DH2 respectively.

In addition, server SV1 includes media 17 for storing software including an operating system 19 and an application program 21. An EFI layer 23 imports hardware drivers during boot up. These drivers include HBA drivers HD1 and HD2, respectively from driver code DH1 and driver code DH2. EFI 23 organizes these drivers in an storage device enumerator function 25.

EFI layer implements method ME1, flow charted in FIG. 1. At method segment MS1, power is turned on or serve SV1 is rebooted. At method segment MS2, EFI 23 is loaded from firmware (of media 17) to memory of hardware resources 25. At method segment MS3, EFI 23 enumerates storage devices and logical units in parallel using the SCSI_PASS_THROUGH_PROTOCOL 27 or the EXT_SCSI_PASS_THROUGH_PROTOCOL 29. The latter includes a GetNextTarget( ) function that makes it possible to have two or more HBAs perform LUN enumeration in parallel. In addition, protocol 29 adds support from some newer technologies, such as "serial-attached SCSI" (SAS).

In the illustrated embodiment, enumeration through HPAs H1 and H2 is performed in parallel. In an alternative embodiment, the HBAs are involved successively in storage device enumeration. Once the storage devices are enumerated, EFI 23 finds a storage device bearing an image of operating system 19 at method segment MS4. At method segment MS5, operating system 19 is booted. Once operating system 19 is running, applications 21 can be launched and run.

Herein, "blocking" refers to preventing execution of an operation until another operation has completed. For example, a BIOS might block a SCSI controller from enumerating one disk while another disk is being enumerated. A non-blocking operation is one that can proceed while another similar operation is pending, as described in U.S. Patent Publication 2005/0289332 to Rothman et al.

Herein, a "computer" is a machine that manipulates data stored in computer-readable media in accordance with a computer-executable program stored in computer-readable media. "Computer-readable media" refers to media that can be accessed by a computer and includes volatile and nonvolatile, removable and non-removable media. By way of example, and not limitation, computer-readable media may comprise computer storage media and communication media.

"Computer storage media" includes volatile and nonvolatile, removable and non-removable media implemented in any method or technology for storage of information such as computer-readable instructions, data structures, program modules or other data. "Computer storage media" encompasses, but is not limited to, random access memory (RAM), read-only memory (ROM), electrically-erasable programmable read-only memory (EEPROM), flash memory or other memory technology, compact disc read-only memory (CDROM), digital versatile storage devices (DVD) or other optical storage device storage, magnetic cassettes, magnetic tape, magnetic storage device storage or other magnetic storage devices, or any other medium which can be used to store the desired information and which can be accessed by computer.

"Communication media" encompasses computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared, and other wireless media. Combinations of any of the above should also be included within the scope of "computer-readable media".

An "extensible firmware interface" is a layer between an operating system and firmware/hardware that functions on power on before the operating system is running and that provides an interface for the operating system to interact with hardware when the operating system is running. The Extensible Firmware Interface is an example of an extensible firmware interface.

The Extensible Firmware Interface (EFI) is a specification that defines a software interface between an operating system and platform firmware. EFI is intended as a significantly improved replacement of the old legacy BIOS firmware interface historically used by all IBM PC compatible personal computers. The EFI specification was originally developed by Intel Corporation, and is now managed by the Unified EFI Forum and is officially known as "Unified EFI" (UEFI). (Wikipedia)

"Boot" refers to a phase and activities between power on or restarting and the time operating system begins to run take control of the system. For example, the boot phase can begin with loading EFI software from firmware, e.g., flash memory.

"Non-Blocking" implies a subject, e.g., the EFI layer or the enumeration function, does not have to wait until one operation is completed for the next one to begin. Conventionally, further storage device enumeration operations are blocked while one is pending. Using the non-blocking SCSI protocols allows the enumerations operations to be performed in parallel.

While hard storage devices are illustrated, the invention can be applied to other forms of non-volatile storage, but are not limited to, read-only memory (ROM), flash memory, erasable programmable read only memory (EPROM), electronically erasable programmable read only memory (EEPROM), non-volatile random access memory (NVRAM), magnetic hard storage devices, a magnetic tape, and optical storage devices, or the like.

While, in the illustrated embodiments, the storage-device interfaces are host-bus adapters, it should be recognized that it is their function rather than their form that is relevant. Thus, storage-device interfaces may be built into a motherboard.

Of course, each of servers SV2 can have a respective EFI layer that performs storage device enumeration. Different servers can have different applications, different operating systems, different media, different hardware including different numbers and types of host bus adapters. These and other variations upon and modifications to the illustrated embodiments are provided for by the present invention, the scope of which is defined by the following claims.

What is claimed is:

1. A computer comprising:
    hardware including at least a first storage-device interface; and
    an extensible firmware interface including a storage-device enumerator function for enumerating storage-devices attached to said storage-device interface using parallel storage-device enumeration operations, said storage-device enumerator function conforming to a SCSI Pass Through Protocol.

2. A computer as recited in claim 1 wherein said SCSI Pass Through Protocol is at least one of a SCSI_PASS_THRU_PROTOCOL and a EXT_SCSI_PASS_THRU_PROTOCOL.

3. A computer as recited in claim 1 wherein said extensible firmware interface provides for locating a storage device image of an operating system on one of said storage devices and running said operating system on said computer.

4. A computer as recited in claim 1 wherein said hardware includes a second storage-device interface and said storage device enumerator function enumerates storage devices via said first and second storage-device interfaces concurrently.

5. A computer as recited in claim 4 wherein said storage device enumerator function employs a GetNextTarget( ) function to enumerate logical units via said first and second storage-device interfaces concurrently.

6. A method comprising:
powering on or rebooting a computer; and
performing parallel storage-device enumeration operations to enumerate storage devices, said storage-device enumerator operations conforming to a SCSI Pass Through Protocol.

7. A method as recited in claim 6 further comprising locating a storage device image of an operating system.

8. A method as recited in claim 7 further comprising running said operating system on said computer.

9. A method as recited in claim 6 wherein parallel storage device enumerations are performed over two or more storage-device interfaces in parallel.

10. A method as recited in claim 9 wherein said enumerating employs a GetNextTarget( ) function to enumerate logical units via said two or more storage-device interfaces concurrently.

11. A product comprising non-transitory tangible computer storage media encoded with a program of computer-executable instructions, said program being configured to, when executed by a processor, implement an extensible firmware interface with an enumeration function that performs storage-device enumeration operations in parallel, said storage-device enumerator operations conforming to a SCSI Pass Through Protocol.

12. A product as recited in claim 11 wherein said extensible firmware interface is configured to find a disk image of an operating system.

13. A product as recited in claim 11 wherein said extensible firmware interface, when executed, causes said operating system to run.

14. A product as recited in claim 11 wherein said extensible firmware interface performs storage-device enumeration over plural storage-device interfaces at once.

15. A product as recited in claim 11 wherein said storage-device enumeration involves enumerating logical units as well as physical devices.

* * * * *